E. E. FRANKIS.
RECEIVER OF WIRELESS SIGNALS.
APPLICATION FILED JUNE 19, 1920.
1,354,290.
Patented Sept. 28, 1920.
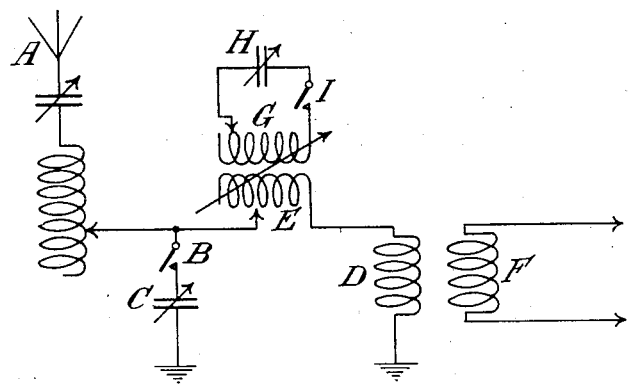
Inventor
Ernest E. Frankis
By Ira J. Adams
Attorney

UNITED STATES PATENT OFFICE.

ERNEST EDWARD FRANKIS, OF HELSTON, ENGLAND, ASSIGNOR TO RADIO CORPORATION OF AMERICA, A CORPORATION OF DELAWARE.

RECEIVER OF WIRELESS SIGNALS.

1,354,299.  Specification of Letters Patent.  Patented Sept. 28, 1920.

Application filed June 19, 1920. Serial No. 390,189.

*To all whom it may concern:*

Be it known that I, ERNEST EDWARD FRANKIS, a subject of the King of Great Britain, and resident of 47 Coinagehall street, Helston, in the county of Cornwall, England, have invented new and useful Improvements in Receivers of Wireless Signals, of which the following is a specification.

The object of this invention is to provide an improved receiver in which it may be possible to detect signals even though waves of a frequency approximating closely to that of the waves which it is desired to detect may be incident upon the aerial.

According to this invention I provide two parallel earth connections for the aerial and I couple an oscillatory circuit and a receiver to one of these connections. Preferably one connection has in it a variable condenser and a switch, while the other has in it two inductance coils, to one of which is coupled a receiving circuit which is preferably of the oscillating type, while to the other is coupled an oscillatory circuit having in it a switch.

My invention is illustrated by the accompanying diagram in which an aerial A is shown with two parallel connections to earth one through a switch B and a variable condenser C, the other through two inductance coils D, E. To D is coupled a receiving circuit F and to E is coupled a circuit comprising an inductance G, a variable condenser H and a switch I.

The method of using this receiver is as follows:—

Supposing two sets of waves of approximately equal length are incident upon the aerial, both switches are opened and the aerial is tuned in any usual way, approximately to one of the wave lengths. The two switches are then closed and the capacities of the condensers H and C are adjusted until the signals which it is desired to detect are clear, while the other signals are totally or almost totally excluded. If now the switches are opened and the wave length to which the aerial circuit as a whole is tuned be ascertained, it will be found to differ considerably from that of either of the incident sets of waves.

With such a receiver I have obtained complete reception of the desired waves and complete rejection of the undesired waves irrespective of the signal strengths, even strong oscillations being cut out without any diminution of the strength of the weaker signals.

What I claim is:—

1. In a receiver for wireless signals, the combination of an aerial, two parallel earth connections thereto, an oscillatory circuit coupled to one only of the connections and a receiving circuit coupled to the same connection and independent of the other earth connection.

2. In a receiver for wireless signals, the combination of an aerial, an earth connection thereto, a condenser in said connection, a second earth connection to the aerial, two inductances in the second connection, an oscillatory circuit coupled to one inductance and a receiver coupled to the other inductance and independent of the other earth connection.

3. In a receiver for wireless signals, the combination of an aerial, an earth connection thereto and a switch in said connection, a second earth connection to the aerial, an oscillatory circuit coupled only to the second connection, and a receiving circuit coupled to the second connection and independent of the other earth connection.

4. In a receiver for wireless signals, the combination of an aerial, two parallel earth connections thereto, an oscillatory circuit coupled to one only of the connections, a switch in said oscillatory circuit and a receiving circuit coupled to the same connection and independent of the other earth connection.

5. In a receiver for wireless signals, the combination of an aerial, an earth connection thereto and a switch in said connection, a second earth connection to the aerial, an oscillatory circuit coupled only to the second connection, a switch in said oscillatory circuit, and a receiving circuit coupled to the second connection and independent of the other earth connection.

6. In a receiver for wireless signals, the combination of an aerial, an earth connection thereto, a condenser and a switch in that connection, a second earth connection to the aerial, two inductances in the second connection, an oscillatory circuit coupled to one inductance and a receiver coupled to the other inductance and independent of the other earth connection.

7. In a receiver for wireless signals, the combination of an aerial, an earth connection thereto, a condenser and a switch in that connection, a second earth connection to the aerial, two inductances in the second connection, an oscillatory circuit coupled to one inductance, a switch in the oscillatory circuit and a receiver coupled to the other inductance and independent of the other earth connection.

In testimony that I claim the foregoing as my invention I have signed my name this 28 day of May, A. D. 1920.

ERNEST EDWARD FRANKIS.